3,391,146
N-SUBSTITUTED CARBAMATES AND THIOCAR-
BAMATES OF 2-QUINOLINEMETHANOLS
John Carl Godfrey, Syracuse, N.Y., assignor to Bristol-
Myers Company, New York, N.Y., a corporation of
Delaware
No Drawing. Filed Nov. 10, 1964, Ser. No. 410,287
9 Claims. (Cl. 260—287)

ABSTRACT OF THE DISCLOSURE 2-quinolinemethanol N-methylcarbamate was prepared by the reaction in pyridine of 2-quinolinemethanol and methyl isocyanate and found to prevent passive cutaneous anaphylaxis in the guinea pig. It failed to block the spasmogenic response to histamine on isolated ileum strips.

This invention relates to new synthetic compounds having valuable anti-inflammatory properties and, more particularly, to N-mono- and di-alkyl carbamates and thiocarbamates of 2-quinolinemethanols.

It was the object of the present invention to provide novel and nontoxic compounds which in mammals exhibit anti-inflammatory activity and prevent passive cutaneous anaphylaxis and which by their nature are free of the undesirable side-effects caused by the steroids generally used for such purposes. It was a further object of the present invention to provide nontoxic agents useful in the alleviation of the symptoms of such inflammatory processes as arthritis and purpura.

The objects of the present invention have been achieved by the provision according to the present invention, of a member selected from the group consisting of a compound of the formula

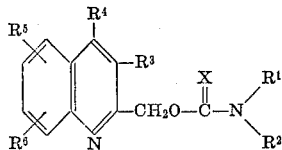

wherein X is a member selected from the group consisting of oxygen and sulfur, $R^1$ is a member selected from the group consisting of hydrogen and (lower)alkyl, $R^2$ represents (lower)alkyl, and $R^3$, $R^4$, $R^5$ and $R^6$ are each a member selected from the group consisting of hydrogen, chloro, bromo, iodo, fluoro, trifluoromethyl, (lower)alkyl, (lower)alkoxy, (lower)alkylthio, nitro, carbalkoxy, (lower)alkanoyl, (lower)alkanoyloxy, (lower)alkanoylamido, di(lower)alkylamino, methylsulfonyl, phenyl and phenoxy; and nontoxic, pharmaceutically acceptable acid addition salts thereof, including salts with organic and inorganic acids such as hydrochloric acid, hydrobromic acid, sulfuric acid, phosphoric acid, acetic acid, maleic acid, tartaric acid, citric acid, sulfamic acid, glycolic acid, succinic acid, ascorbic acid and the like.

Preferred embodiments of the present invention are the compounds of the formula

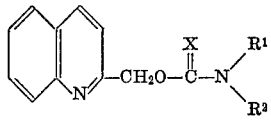

wherein X is oxygen or sulfur, $R^1$ is hydrogen or (lower)alkyl and $R^2$ is (lower)alkyl.

The compounds of the present invention are synthesized from alcohols of the structure

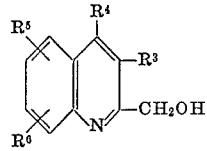

wherein $R^3$, $R^4$, $R^5$ and $R^6$ have the meaning set forth above in any one of three ways, i.e.

(a) by reaction with compounds of the formula $$R^2NCO \text{ or } R^2NCS$$

wherein $R^2$ represents (lower)alkyl, or (b) by reaction with compounds of the formula

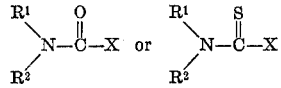

wherein $R^1$ is hydrogen or (lower)alkyl, $R^2$ is (lower)alkyl and X is halogen, alkoxy or phenoxy, or (c) by reaction with phosgene or thiophosgene and then with an amine of the formula

wherein $R^1$ is hydrogen or (lower)alkyl and $R^2$ is (lower)alkyl.

Thus, in one process of the present invention the appropriate 2-quinolinemethanol is reacted with an alkyl isocyanate or isothiocyanate in a solvent or diluent such as benzene, toluene, chlorobenzene, acetonitrile, chloroform, tetrahydrofuran or pyridine. The reaction is preferably carried out at a temperature from room temperature to 150° C., especially at about the boiling point of the solvent or, when in pyridine, in a pressure vessel at about 100° C. If desired, use is made of a catalyst such as a tertiary amine, e.g. trimethylamine, triethylamine, N-alkylpiperidine, pyridine, or a metal alkoxide, e.g. potassium tert.-butoxide. In place of the alkyl isocyanate or isothiocyanate use can be made of compounds which are converted under the reaction conditions, e.g. upon heating, to such isocyanates or isothiocyanates; such compounds include acyl azides, S-alkyl thiolcarbamates, S-alkyl dithiocarbamates, and mixtures of S-alkyl thiolcarbamates or S-alkyl dithiolcarbamates with trialkylamines or heavy metal salts such as silver nitrate.

In another process of the present invention the appropriate 2-quinolinemethanol is reacted with an acid chloride of the formula given in (b) above in a solvent with heating if desired. When the acid chloride is replaced by an ester, as where X in (b) represents alkoxy or phenoxy, use is made of a catalyst such as sulfuric acid, toluene sulfonic acid, and trifluoroacetic acid or of a metal alkoxide such as aluminum isopropoxide or potassium tert.-butoxide. Conditions used are otherwise as noted above.

In the third process the appropriate 2-quinolinemethanol is dissolved or suspended in an organic solvent and, if desired, a tertiary amine is added as a catalyst or dehydrochlorinating agent. Then phosgene or thiophosgene is added, preferably at room temperature or better below 10° C. Finally there is added a mono- or di-(lower)alkylamine to form the desired product.

The 2-quinolinemethanols used as reagents in the processes of the present invention are prepared most frequently from the corresponding quinolines. Thus the appropriately substituted 2-quinaldine (2-methylquinoline) is oxidized by selenium dioxide to the substituted 2-quinaldehyde (2-quinoline-aldehyde) according to the general procedures described, for example, by Brown et al., J. Chem. Soc., 1951, 1145–1149; C.A., 34, 6280[7]; C.A., 54, 7707i; C.A., 57, 6543b; and V. Ramsey, J. Amer. Pharm. Assoc., 40, 564 (1951). The substituted 2-quinaldehyde is converted by reaction with formaldehyde in a crossed Cannizzaro reaction to the substituted 2-quinolinemethanol by the general procedures described, for example, by Campbell et al., J. Amer. Chem. Soc., 68, 1851 (1946); by Phillips, J. Amer. Chem. Soc., 68, 2568 (1946); and by Radionov et al., C.A., 39, 4606 (1945) and 40, 4066 (1946). Alternatively, the 2-quinaldehyde is reduced to the 2-quinolinemethanol by aluminum isopropoxide reduction, as illustrated by the procedure of McDonald, J. Amer. Chem. Soc., 69, 1219 (1947) or by catalytic hydrogenation for which see Arch. Pharm., 292, 682–690 (1959) or by reduction with lithium aluminum hydride per Chem. Ber., 85, 152–159 (1952).

In another procedure, an appropriately substituted 2-quinaldine is converted as given in C.A., 46, 2055h or according to the procedure of Brown et al., J. Chem. Soc., 1951, 1145–1149, or by reaction with N-bromosuccinimide in the usual manner (e.g. C.A., 52, 9124e) to the 2-bromomethylquinoline which is then converted to the desired 2-quinolinemethanol, as by reaction with alcoholic silver nitrate according to Hammich, J. Chem. Soc., 1926, 1302.

In addition, appropriately substituted 2-quinolinecarboxylic acid esters or azides are reduced to the desired 2-quinolinemethanols by a complex metal hydride (e.g. lithium aluminum hydride, di-isobutyl aluminum hydride, sodium borohydride) according to Kaslow et al., J. Org. Chem., 18, 55–58 (1953) or Rosenmund et al., Ber., 85, 152 (1952) or Bames et al., J. Amer. Chem. Soc., 75, 3830–3831 (1953).

In another procedure for obtaining substituted 2-quinolinemethanols, the corresponding quinaldine is heated with 30% hydrogen peroxide in glacial acetic acid and then treated with acetic anhydride according to the directions of Boekelheide et al., J. Amer. Chem. Soc., 76, 1286–1291 (1954) to give the acetate from which the desired 2-quinolinemethanol is obtained by hydrolysis with hydrochloric acid.

Reference above to an abstract in Chemical Abstracts incorporates herein by reference the full text of the publication or patent of the abstract and also any pertinent references cited in such publication or patent.

The term "(lower)alkyl" as used herein refers to straight and branched chain saturated monovalent aliphatic hydrocarbon radicals having from one to ten carbon atoms inclusive, e.g. methyl, ethyl, propyl, isopropyl, butyl, normal and secondary and tertiary butyl, amyl, decyl, etc.

The preferred (lower)alkyl groups are those having from one to six carbon atoms. Similarly the term "(lower)alk-" in such terms as (lower)alkoxy and (lower)alkylamino limits the alkyl moiety of the latter radicals to the same alkyl group as defined above.

The compounds of this invention are useful in the treatment of disease in animals, including particularly the higher animals such as horses, dogs, etc. The compounds are particularly useful in the treatment of inflammatory diseases, including rheumatic fever, purpura rheumatica, rheumatoid arthritis and angina pectoris, and in the treatment of the hypersecretion of secretory glands such as the sweat glands. The utility of the present compounds is enhanced by the absence of steroidal side effects and their lack of monoamine oxidase inhibiting activity.

The compounds are administered to the affected host in amounts ranging from 2 to 50 mg. per kilogram of body weight per day. The usual dosage is from about 5 to about 30 mg. per kg. per day. The compounds can be administered parenterally and, preferably, orally. The compounds can be orally administered in the conventional forms, i.e. as tablets, capsules, suspensions, etc. The compounds of this invention can be combined in one dosage form with other therapeutically effective agents, including analgesics and the steroids which have also been used in the treatment of inflammatory disease.

The following examples are given in illustration, but not in limitation, of the present invention. All temperatures are given in degrees centigrade.

Example 1

2-quinolinemethanol.—A mixture of 6.1 g. (0.16 mole) of lithium aluminum hydride (Metal Hydrides, Inc.) and 700 ml. of dry ether was refluxed for two hours in a Soxhlet Apparatus which contained 25.0 g. (0.159 mole) of quinoline-2-aldehyde in the extraction thimble. The cooled reaction mixture was stirred with 15 ml. of saturated aqueous magnesium sulfate and the insoluble salts were removed by filtration. Removal of solvent from the filtrate left a read oil which was distilled in vacuum to give 2-quinolinemethanol as a colorless oil, 8.3 g., B.P. 136–139° at 1.4 mm.

2 - quinolinemethanol N - methylcarbamate.—A mixture of 5.0 g. (0.031 mole) of 2-quinolinemethanol, 40 ml. of pyridine, and 2.9 g. (0.051 mole) of methyl isocyanate was heated in a pressure bottle in a steam bath for one hour. The pyridine was removed in vacuo, the residue taken up in 200 ml. of ether and extracted with four 100 ml. portions of water. The ether solution was dried over sodium sulfate, treated with decolorizing carbon and filtered. Removal of the ether and trituration with 40 ml. of lower alkanes (Skellysolve-B) gave 1.65 g. (24%) of the product, 2-quinolinemethanol N-methylcarbamate, as needles, M.P. 79–84° which were recrystallized from ether Skellysolve-B three times to give 1.00 g. of product as colorless needles, M.P. 94.5–95.0°. Its infrared spectrum (KBr) showed the carbamate carbonyl at 1725 cm.$^{-1}$, while its NMR spectrum (CDCl$_3$) had an aromatic pattern at 8.3 to 7.2 p.p.m. (6H), —CH$_2$— and —NH— at 5.5 to 4.7 p.p.m. (3H), and the —CH$_3$ doublet at 2.8 p.p.m. (3H).

Analysis.—Calc'd for C$_{12}$H$_{12}$N$_2$O$_2$: N, 12.95. Found: N, 12.60.

This compound was shown to prevent passive cutaneous anaphylaxis in the following manner.

In the guinea pig test 2 ml. of the test solution or suspension in 0.9% saline were injected subcutaneously on one side of the shaved abdomen of white guinea pigs weighing 250–300 gm. One-half hour later a 0.1 ml., intradermal injection of a 1:2500 dilution in 0.9% saline of a commercially obtained rabbit antiovalbumin serum was made at the center of the subcutaneous injection. A similar injection was also made on the contralateral side of the abdomen where no local drug treatment was given.

Four hours later 1.0 ml. of a combined 0.5% ovalbumin and 1.0% Evans blue dye solution in 0.9% saline was injected intravenously. An anaphylactic response with consequent vascular damage was manifested by extravasation of the Evans blue dye from the circulation to form a clearly demarkated, blue spot. Since the Evans blue dye is protein bound, damage to the vessel walls had to be extensive enough that protein was escaping to give a positive response.

Complete prevention of any blue discoloration in the skin was used as the criteria for effectiveness. This was determined after sacrificing the animal, reflecting the skin, and examining the underside after it was freed of all subcutaneous tissue.

At a concentration of 0.15% this compound completely blocked the response in two out of three animals; the response was not blocked in any of the three controls, i.e., at the untreated sites.

Since antihistaminic agents are also active in the above test, this compound was tested on isolated guinea pig ileum strips for its ability to block the spasmogenic response to histamine and found to be essentially inactive at levels up to 50 mcg./ml. in the bath.

Example 2

Substitution in the procedure of Example 1 for the quinoline-2-aldehyde (2-quinaldehyde) therein of an equimolar weight of 8-nitro-2-quinaldehyde (C.A., 20, 2862[2]),
3-acetamido-2-quinaldehyde (C.A., 40, 1839[2]),
6,7-dimethoxy-2-quinaldehyde (C.A., 37, 6266[1]),
3,8-dimethyl-2-quinaldehyde (C.A. 34, 6280[7]),
3,8-dimethyl-5-nitro-2-quinaldehyde (C.A. 34, 6280[9]),
8-ethyl-2-quinaldehyde (C.A. 35, 2895[4]),
8-methoxy-2-quinaldehyde (C.A. 50, 2592h),
3-methyl-2-quinaldehyde (C.A. 47, 1702i),
4-methyl-2-quinaldehyde (C.A. 47, 3312c),
6-methyl-2-quinaldehyde (C.A. 44, 6868f),
8-methyl-2-quinaldehyde (C.A. 49, 13244b),
4,7-dichloro-2-quinaldehyde (C.A. 51, 11351c),
7-methyl-2-quinaldehyde (C.A. 51, 7368e),
6-bromo-2-quinaldehyde (C.A. 52, 9123h),
6-chloro-2-quinaldehyde (C.A. 52, 9123h),
7-chloro-2-quinaldehyde (C.A. 52, 9123h),
8-chloro-2-quinaldehyde (C.A. 52, 9123h),
6-methoxy-2-quinaldehyde (C.A. 52, 9123h),
6,7-dimethoxy-4-phenyl-2-quinaldehyde (C.A. 53, 9225d),
6-ethoxy-2-quinaldehyde (C.A. 53, 21953d),
5-methyl-2-quinaldehyde (C.A. 54, 7707i),
5,8-dimethoxy-2-quinaldehyde (C.A. 56, 8689i),
6-nitro-2-quinaldehyde (C.A. 56, P4739e) and
5-chloro-7-iodo-8-methoxy-2-quinaldehyde (C.A. 57, 6543b), respectively, produces 8-nitro-2-quinolinemethanol N-methylcarbamate,
3-acetamido-2-quinolinemethanol N-methylcarbamate,
6,7-dimethoxy-2-quinolinemethanol N-methylcarbamate,
3,8-dimethyl-2-quinolinemethanol N-methylcarbamate,
3,8-dimethyl-5-nitro-2-quinolinemethanol N-methylcarbamate,
8-ethyl-2-quinolinemethanol N-methylcarbamate,
8-methoxy-2-quinolinemethanol N-methylcarbamate,
3-methyl-2-quinolinemethanol N-methylcarbamate,
4-methyl-2-quinolinemethanol N-methylcarbamate,
6-methyl-2-quinolinemethanol N-methylcarbamate,
8-methyl-2-quinolinemethanol N-methylcarbamate,
4,7-dichloro-2-quinolinemethanol N-methylcarbamate,
7-methyl-2-quinolinemethanol N-methylcarbamate,
6-bromo-2-quinolinemethanol N-methylcarbamate,
6-chloro-2-quinolinemethanol N-methylcarbamate,
7-chloro-2-quinolinemethanol N-methylcarbamate,
8-chloro-2-quinolinemethanol N-methylcarbamate,
6-methoxy-2-quinolinemethanol N-methylcarbamate,
6,7-dimethoxy-4-phenyl-2-quinolinemethanol N-methylcarbamate,
6-ethoxy-2-quinolinemethanol N-methylcarbamate,
5-methyl-2-quinolinemethanol N-methylcarbamate,
5,8-dimethoxy-2-quinolinemethanol N-methylcarbamate,
6-nitro-2-quinolinemethanol N-methylcarbamate and
5-chloro-7-iodo-8-methoxy-2-quinolinemethanol N-methylcarbamate.

Example 3

Substitution in the procedure of Example 1 for the 2-quinolinemethanol therein of an equimolar weight of 3,4-dichloro-2-quinolinemethanol (C.A., 25, 2430[3]),
3,8-dimethyl-2-quinolinemethanol (C.A., 34, 6280[8]) and
4-methyl-2-quinolinemethanol (C.A., 50, 13926d), respectively, produces 3,4-dichloro-2-quinolinemethanol N-methylcarbamate,
3,8-dimethyl-2-quinolinemethanol N-methylcarbamate and
4-methyl-2-quinolinemethanol N-methylcarbamate, respectively.

Example 4

Substitution in the procedures of Examples 1 and 2 for the methyl isocyanate used therein of an equimolar weight of methyl isothiocyanate produces the corresponding N-methylthiocarbamates.

Example 5

Substitution in the procedures of Examples 1 and 2 for the methyl isocyanate used therein of an equimolar weight of ethyl isocyanate, isopropyl isocyanate, sec.-butyl isocyanate and ethyl isothiocyanate, respectively, produces the corresponding N-ethylcarbamates, N-isopropylcarbamates, N-sec.-butylcarbamates and N-ethylthiocarbamates, respectively.

Example 6

A mixture of one mole each of 2-quinolinemethanol and N,N-dimethyl-carbamyl chloride are refluxed one hour in ten volumes of pyridine. The pyridine is removed by distillation in vacuo and the residue is stirred in alkaline water and extracted with chloroform. Removal of the chloroform and recrystallization from methanol provides the desired product, 2-quinolinemethanol N,N-dimethylcarbamate, which is converted to its hydrochloride by reaction with one mole of hydrochloric acid.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:

1. A member selected from the group consisting of a compound of the formula

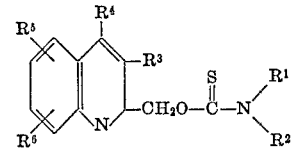

wherein X is oxygen and sulfur, $R^1$ is hydrogen or a (lower)alkyl group having from 1 to 6 carbon atoms, $R^2$ is a (lower)alkyl group having from 1 to 6 carbon atoms and $R^3$, $R^4$, $R^5$ and $R^6$ are each hydrogen, chloro, bromo, fluoro, iodo, trifluoromethyl, methyl, methoxy, methylthio, nitro, carbomethoxy, acetyl, acetoxy, acetamido, dimethylamino, methylsulfonyl, phenyl or phenoxy; and nontoxic pharmaceutically acceptable salts thereof.

2. A compound of the formula

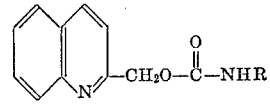

wherein R is a (lower)alkyl group having from 1 to 6 carbon atoms.

3. A compound of the formula

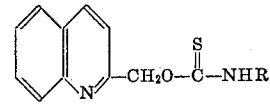

wherein R is a (lower)alkyl group having from 1 to 6 carbon atoms.

4. A compound of the formula

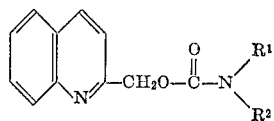

wherein $R^1$ and $R^2$ are each a (lower)alkyl group having from 1 to 6 carbon atoms.

5. 2-quinolinemethanol N-methylcarbamate.
6. 2-quinolinemethanol N-methylthiocarbamate.
7. 2-quinolinemethanol N,N-dimethylcarbamate.
8. 2-quinolinemethanol N,N-dimethylthiocarbamate.
9. 3,8 - dimethyl-2-quinolinemethanol N-methylcarbamate.

References Cited

UNITED STATES PATENTS

| | | | |
|---|---|---|---|
| 2,449,440 | 9/1948 | Aeschlimann | 260—287 X |
| 3,071,588 | 1/1963 | Rorig | 260—287 X |
| 3,198,473 | 7/1965 | Klosa | 260—287 X |

NICHOLAS S. RIZZO, *Primary Examiner.*

ALEX MAZEL, *Examiner.*

D. DAUS, *Assistant Examiner.*